United States Patent
Uusitalo

(10) Patent No.: US 7,095,638 B2
(45) Date of Patent: Aug. 22, 2006

(54) CONTROLLER FOR COMPLEMENTARY SWITCHES OF A POWER CONVERTER AND METHOD OF OPERATION THEREOF

(75) Inventor: Jouni Uusitalo, Rockwall, TX (US)

(73) Assignee: Tyco Electronics Power Systems, Inc., Mesquite, TX (US)

( * ) Notice: Subject to any disclaimer, the term of this patent is extended or adjusted under 35 U.S.C. 154(b) by 92 days.

(21) Appl. No.: 10/654,217

(22) Filed: Sep. 3, 2003

(65) Prior Publication Data

US 2005/0046404 A1    Mar. 3, 2005

(51) Int. Cl.
*H02M 3/24*    (2006.01)
(52) U.S. Cl. .............................. 363/97; 363/89; 307/66
(58) Field of Classification Search ......... 363/16–21.6, 363/21.7, 20, 89, 56, 45–48, 127, 125, 95–98; 323/222, 223, 282, 284
See application file for complete search history.

(56) References Cited

U.S. PATENT DOCUMENTS

| | | | |
|---|---|---|---|
| 5,126,931 A | 6/1992 | Jitaru | |
| 5,303,138 A | 4/1994 | Rozman | |
| 5,798,635 A * | 8/1998 | Hwang et al. | 323/222 |
| RE36,098 E | 2/1999 | Vinciarelli | |
| 5,956,245 A | 9/1999 | Rozman | |
| RE36,571 E * | 2/2000 | Rozman | 363/21.6 |
| 6,049,471 A * | 4/2000 | Korcharz et al. | 363/20 |
| 6,061,254 A | 5/2000 | Takegami | |
| RE37,221 E * | 6/2001 | Bowman et al. | 363/21.06 |
| 6,252,781 B1 * | 6/2001 | Rinne et al. | 363/16 |
| 6,396,714 B1 | 5/2002 | Kato | |
| 6,473,317 B1 | 10/2002 | Simopoulos | |
| 6,703,817 B1 * | 3/2004 | Cohen | 323/282 |

* cited by examiner

*Primary Examiner*—Rajnikant B. Patel

(57) ABSTRACT

A controller for, and related method of, controlling first and second alternately conducting switches of a power converter. In one embodiment, the controller includes a sensing circuit configured to sense a parameter representative of an input voltage of the power converter. The controller also includes a modification circuit configured to alter a drive signal to one of the first and second switches thereby modifying a delay between conduction intervals of the first and second switches as a function of the input voltage.

20 Claims, 3 Drawing Sheets

US 7,095,638 B2

CONTROLLER FOR COMPLEMENTARY SWITCHES OF A POWER CONVERTER AND METHOD OF OPERATION THEREOF

TECHNICAL FIELD OF THE INVENTION

The present invention is directed, in general, to power supplies and, more specifically, to a controller for complementary switches of a power converter, method of operation thereof and power converter employing the same.

BACKGROUND OF THE INVENTION

A power converter is a power processing circuit that converts an input voltage level into a specified output voltage level. In many applications requiring a DC output, switched-mode DC/DC converters are frequently employed to advantage. DC/DC converters generally include at least one power switch, a transformer and a rectifier on a secondary side of the transformer. The rectifier within the converter generates a DC voltage at the output of the converter. Conventionally, the rectifier includes a plurality of rectifying diodes that conduct the load current only when forward-biased in response to an input waveform to the rectifier. However, diodes produce a voltage drop thereacross when forward-biased. Given an escalating requirement for a more compact converter that delivers a lower output voltage (e.g., 3.3 volts for a central processing unit of a computer), it is highly desirable to avoid the voltage drop inherent in the rectifying diodes and thereby increase the efficiency of the converter.

A more efficient rectifier can be attained in converters by replacing the rectifying diodes with active switches, such as field effect transistors. The switches are periodically toggled between conducting and non-conducting states in synchronization with the periodic waveform to be rectified. A rectifier employing active switches is conventionally referred to as a synchronous rectifier. For a better understanding of synchronous rectifiers and the control thereof, see U.S. Pat. No. 5,956,245 entitled "Circuit and Method for Controlling a Synchronous Rectifier Converter," issued Sep. 21, 1999 to Rozman, which is incorporated herein by reference.

In low to medium level power applications (e.g., 30 to 800 watts), a forward converter topology is widely used. A DC/DC forward converter generally includes a transformer, a power switch on a primary side of the transformer, and a rectifier and output filter on a secondary side of the transformer. The power switch, coupled in series with a primary winding of the transformer, converts an input DC voltage into an AC voltage. The transformer then transforms the AC voltage to another value and the rectifier generates therefrom a desired DC voltage that is filtered by the output filter at an output of the forward converter.

A practical concern regarding forward converters, and power converters in general, is that a magnetizing current of the transformer should be taken into account during the design of the converter. Otherwise, the magnetic energy stored in a core of the transformer by the magnetizing current may cause a failure in the converter. One approach for dealing with the magnetic energy (and reducing the deleterious effects associated therewith) is to introduce an active clamp circuit across the power switch of the forward converter.

A conventional active clamp circuit includes a series-coupled clamp switch and clamp capacitor, coupled across the power switch, that clamps a voltage across the windings of the transformer when the power switch is not conducting. When the power switch is transitioned to a non-conducting state, the clamp switch conducts to recover the magnetic energy stored in the core of the transformer to the clamp capacitor. As a result, the magnetic energy is dissipated to allow a reset of the core of the transformer. For additional information about clamp circuits and the benefits associated therewith, see U.S. Pat. No. 5,126,931 entitled "Fixed Frequency Single Ended Forward Converter Switching at Zero Voltage," issued Jun. 30, 1992 to Jitaru, and U.S. Pat. No. 5,303,138 entitled "Low Loss Synchronous Rectifier for Application to Clamped-mode Power Converters," issued Apr. 12, 1994 to Rozman, which are incorporated herein by reference.

Thus, when employing an active clamp in a forward converter, the power switch conducts for a primary duty cycle D to impress the DC input voltage across the primary winding of the transformer. The power switch is then transitioned to a non-conducting state and the clamp switch conducts for a complementary duty cycle 1-D to allow the active clamp circuit to reset the transformer. As described in U.S. Pat. No. RE 36,098 entitled "Optimal Resetting of the Transformer's Core in Single-Ended Forward Converters," issued Feb. 16, 1999 to Vinciarelli, which is incorporated herein by reference, it is preferable to introduce a delay between conduction periods of the power switch and the clamp switch of the forward converter.

A delay between the conduction periods of the power switch and clamp switch substantially forecloses an opportunity for cross current conduction therebetween. As clearly understood by those skilled in the art, cross current conduction between the power switch and clamp switch may cause a sharp rise in a current in the forward converter thereby leading to a potential failure of components therein. Additionally, in forward converters employing a synchronous rectifier having a pair of complementary synchronous rectifier switches on the secondary side of the transformer, incorporating the delay further reduces the probability of cross current conduction between the synchronous rectifier switches thereof.

Conversely, it is important to maintain as small a delay between the conduction intervals of the power switch and clamp switch as is practical inasmuch as the forward converter may not be processing energy during the period of delay resulting in a less efficient converter. Additionally, in forward converters employing the complementary pair of synchronous rectifier switches, a body diode of the synchronous rectifier switch being transitioned to a non-conducting state may conduct when the period of delay is excessive thereby decreasing the efficiency of the converter. Therefore, a controller for the power switch and the clamp switch is predisposed to incorporate a definite, but small, delay between the non-conducting state of the power switch and the conducting state of the clamp switch, and vice versa.

In many instances, however, the delay between the conduction periods of complementary switches in the power converter has been static. In other words, a designer of the power converter predetermines the period of delay for selected operating conditions and the period of delay remains the same notwithstanding the true operating conditions of the power converter. A static delay, however, in view of the variable operating conditions of the power converter can be problematic.

There have been attempts proposed in the past to vary drive signals to selected switches in a power converter. One system of providing a variable drive signal to switches in a power converter was introduced in U.S. Pat. No. RE 37,221 entitled "Power Converter Adaptively Driven," issued Jun. 12, 2001 to Bowman, et al. ("Bowman"), which is incorporated herein by reference. Bowman recognized that a delay introduced in a drive waveform between the inverter (i.e, the power switch) and synchronous rectifier of the power converter should not be static, but rather should be variable. Bowman, therefore, introduced a variable nonconcurrent change in the state of the inverter and the synchronous rectifier according to a function of operating conditions of the power converter. While Bowman provides a variable delay between the inverter and synchronous rectifier of a power converter, the reference does not address a delay between two complementary switches in a power converter such as a forward converter employing an active clamp.

Accordingly, what is needed in the art is a system and method capable of altering a drive signal to at least one of a pair of complementary switches of a power converter thereby modifying a delay between conduction periods thereof based upon selected operating parameters associated with the power converter.

SUMMARY OF THE INVENTION

To address the above-discussed deficiencies of the prior art, the present invention provides a controller for use with a power converter including first and second alternately conducting switches. In one embodiment, the controller includes a sensing circuit configured to sense a parameter representative of an input voltage of the power converter. The controller also includes a modification circuit configured to alter a drive signal to one of the first and second switches thereby modifying a delay between conduction intervals of the first and second switches as a function of the input voltage.

In another aspect, the present invention provides a method of controlling first and second alternately conducting switches of a power converter. In one embodiment, the method includes sensing a parameter representative of an input voltage of the power converter. The method also includes altering a drive signal to one of the first and second switches thereby modifying a delay between conduction intervals of the first and second switches as a function of the input voltage.

Thus, the present invention provides a controller for, and related method of, controlling complementary switches in a power converter. By the term "complementary switches," it is intended that the first and second switches are controlled to cause the first and second switches to alternately conduct over a switching cycle of the power converter. As an example, the first switch conducts for a primary duty cycle (D) and the second switch conducts for a complementary duty cycle (1-D) of a switching cycle of the power converter. Furthermore, the complementary switches are preferably controlled to incorporate a delay between the conduction periods of the first and second switches. For instance, when the first switch is transitioned to a non-conducting state, the controller interjects a period of delay prior to transitioning the second switch to a conducting state, and vice versa. The period of delay is often referred to as a "dead" period in the field of power electronics.

In yet another aspect, the present invention provides a power converter having an input that receives an input voltage and provides an output voltage at a output thereof. In one embodiment, the power converter includes a primary circuit, coupled to the input, having first and second alternately conducting switches. The power converter also includes a transformer including a primary winding and a secondary winding with the primary circuit being coupled to the primary winding. The power converter also includes a secondary circuit, coupled to the secondary winding, including first and second synchronous rectifier switches.

The power converter still further includes a controller having a sensing circuit that senses a parameter representative of the input voltage of the power converter. The controller also includes a modification circuit that alters a drive signal to one of the first and second switches thereby modifying a delay between conduction intervals of the first and second switches as a function of the input voltage.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
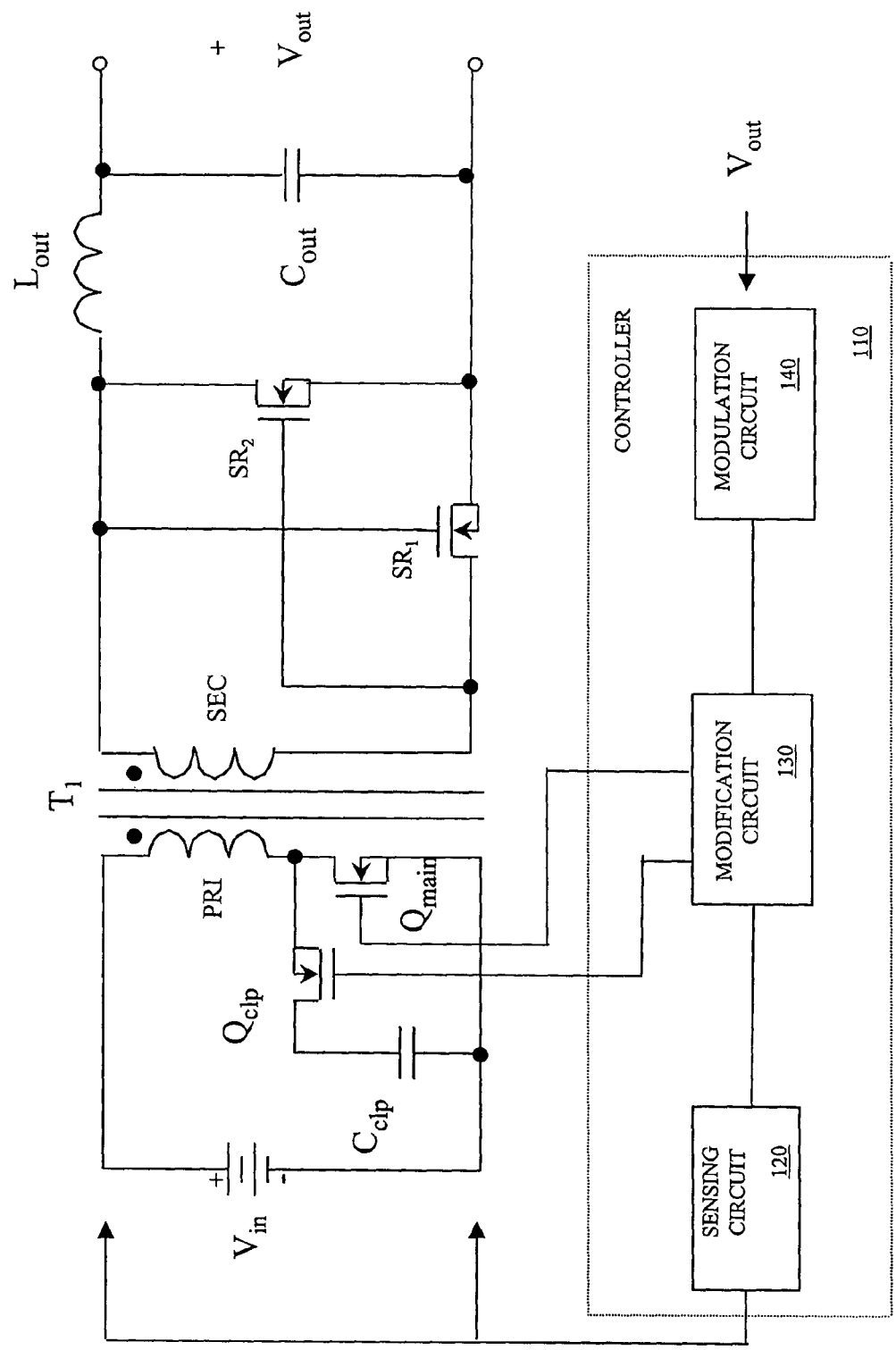
FIG. 1 illustrates a schematic diagram of an embodiment of a power converter employing a controller constructed according to the principles of the present invention.

Referring initially to FIG. 1, illustrated is a schematic diagram of an embodiment of a power converter (e.g., a forward converter) employing a controller 110 constructed according to the principles of the present invention. The forward converter includes a primary circuit that receives an input voltage $V_{in}$ at an input thereof. The primary circuit includes a main switch (also referred to as a first switch) $Q_{main}$ and an active clamp circuit. The active clamp circuit includes a series-coupled clamp switch (also referred to as a second switch) $Q_{clp}$ and clamp capacitor $C_{clp}$ coupled across the main switch $Q_{main}$. The forward converter also includes a transformer $T_1$ having a primary winding PRI, coupled to the primary circuit, and a secondary winding SEC.

The forward converter further includes a secondary circuit coupled to the secondary winding SEC of the transformer $T_1$. The secondary circuit includes a rectifier formed by a first synchronous rectifier switch $SR_1$ and a second synchronous rectifier switch $SR_2$. A rectifier employing active switches is conventionally referred to as a synchronous rectifier. The secondary circuit also includes an output filter formed by an output inductor $L_{out}$ and an output capacitor $C_{out}$. The secondary circuit provides an output voltage $V_{out}$ at an output of the forward converter. The forward converter still further includes the controller 110 that includes a sensing circuit 120, a modification circuit 130 and a modulation circuit 140. The controller 110 modulates a duty cycle of the main and clamp switches $Q_{main}$, $Q_{clp}$ to, in part, regulate the output voltage $V_{out}$ of the forward converter. While the controller 110 will herein be described in the environment of a forward converter, it should be understood that the principles equally apply to other power converters employing complementary switches therein.

The forward converter 100 generally operates as follows. During a primary interval, the controller 110 causes the main switch $Q_{main}$ to conduct for a primary duty cycle (D) to apply the input voltage Vin across the primary winding PRI of the transformer $T_1$. During the primary interval, a magnetizing current associated with the transformer $T_1$ rises as energy is stored in the transformer $T_1$. Then, the controller 110 transitions the main switch $Q_{main}$ to a non-conducting state and, during a complementary interval, causes the clamp switch $Q_{clp}$ to conduct for a complementary duty cycle (1-D). During the complementary interval, the clamp capacitor $C_{clp}$ absorbs the magnetic energy stored in a primary magnetizing inductance of the transformer and limits a voltage stress across the main switch $Q_{main}$ to a voltage across the clamp capacitor $C_{clp}$ and the input voltage $V_{in}$. While the main switch $Q_{main}$ is not conducting, the magnetic energy is recovered and returned to the input via the clamp capacitor $C_{clp}$, thereby resetting the core of the transformer $T_1$.

Thus, the switching action of the main switch $Q_{main}$ converts a DC input voltage $V_{in}$ into an AC voltage necessary to operate the transformer $T_1$. The transformer $T_1$ then scales the AC voltage to an appropriate value. The scaled AC voltage is then rectified by the synchronous rectifier and filtered by the output filter to produce a DC output voltage $V_{out}$. Regarding the operation of the controllable switches of the forward converter, the main switch $Q_{main}$ and the first synchronous rectifier switch $SR_1$ primarily conduct during the primary interval of the forward converter. Conversely, the clamp switch $Q_{clp}$ and the second synchronous rectifier switch $SR_2$ primarily conduct during the complementary interval of the forward converter.

For the reasons as stated above, it is preferable to incorporate a "dead" period between the primary and complementary intervals of the forward converter. The controller 110 therefore is designed to incorporate a delay between the conduction states of the main switch $Q_{main}$ and the clamp switch $C_{clp}$. As mentioned above, a static delay in view of the variable operating conditions of the forward converter can be problematic. Thus, the controller 110 is configured to vary a drive signal to one of, or both, of the alternately conducting main and clamp switches $Q_{main}$, $Q_{clp}$. As a result, the period of delay between conduction intervals of the main and clamp switches $Q_{main}$, $Q_{clp}$, and, ultimately, the first and second synchronous rectifier switches $SR_1$, $SR_2$ may be modified.

More specifically, the modulation circuit (e.g., a pulse width modulation circuit) 140 varies a duty cycle of the drive signals (e.g., pulse width modulated drive signals) for the main and clamp switches $Q_{main}$ to, in part, regulate the output voltage $V_{out}$ of the forward converter. The modulation circuit 140 monitors the output voltage $V_{out}$ and produces a drive signal that induces the main switch $Q_{main}$ to conduct for a primary duty cycle (D) to maintain a regulated the output voltage $V_{out}$. Additionally, the modulation circuit 140 produces a drive signal that induces the clamp switch $Q_{clp}$ to conduct for a complementary duty cycle (D) to, ultimately, reset the core of the transformer $T_1$ of the forward converter.

The modulation circuit 140 further incorporates a delay between the conduction intervals of the main and clamp switches $Q_{main}$, $Q_{clp}$. As an example, at the conclusion of the complementary interval, the modulation circuit 140 transitions the clamp switch $Q_{clp}$ to a non-conducting state and, prior to transitioning the main switch $Q_{main}$ to a conducting state, incorporates a delay before commencing the primary interval. While it is an objective to maintain as small a delay as is practical, it is preferable to incorporate a definite delay to substantially foreclose a cross current conduction condition as discussed above.

The sensing circuit 120 of the controller 110 senses a parameter representative of the input voltage $V_{in}$ of the forward converter. While in the illustrated embodiment the sensing circuit is shown directly sensing the input voltage $V_{in}$, it should understood that other parameters, in place of or in addition to, may be sensed to obtain information about the input voltage $V_{in}$ of the forward converter. For instance, the sensing circuit 120 may sense the primary duty cycle (D) associated with the main switch $Q_{main}$ or, in power converters employing a bias winding, the sensing circuit 120 may sense a bias voltage associated therewith. The modification circuit 130 of the controller 110 then alters the drive signal produced by the modulation circuit 140 to one of the main and clamp switches $Q_{main}$, $Q_{clp}$. As a result, a delay between conduction intervals of the main and clamp switches $Q_{main}$, $Q_{clp}$ and, consequently, the first and second synchronous rectifier switches $SR_1$, $SR_2$ may be modified as a function of the input voltage $V_{in}$.

Thus, as the input voltage $V_{in}$ changes, the controller 110 may modify the delay as a function thereof to take into account the operating conditions of the forward converter. For instance, at a higher input voltage $V_{in}$ (e.g., 75 volts), the controller 110 may incorporate a shorter period of delay than at design conditions (e.g., an input voltage $V_{in}$ of 48 volts) to maintain or enhance the efficiency of the forward converter. Conversely, at a lower input voltage $V_{in}$ (e.g., 36 volts), the controller 110 may incorporate a longer period of delay than at design conditions (e.g., an input voltage $V_{in}$ of 48 volts) to achieve similar results. In other words, the controller 110 induces a variable delay between the primary and complementary intervals of the forward converter as a function of the input voltage $V_{in}$ thereto.

Figure 2:
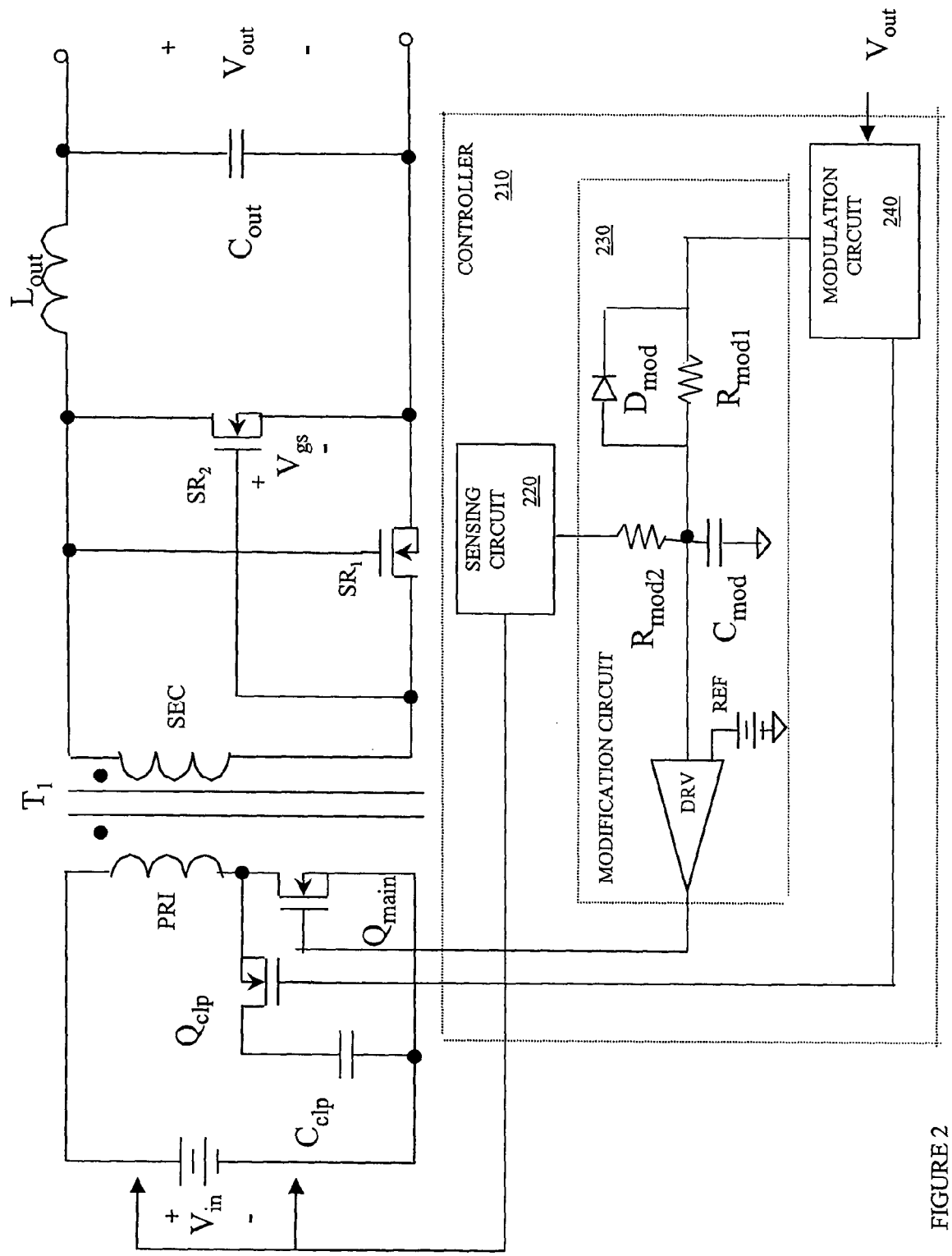
FIG. 2 illustrates a schematic diagram of another embodiment of a power converter employing a controller constructed according to the principles of the present invention.

Turning now to FIG. 2, illustrated is a schematic diagram of another embodiment of a power converter (e.g., a forward converter) employing a controller 210 constructed according to the principles of the present invention. The forward converter includes a primary circuit that receives an input voltage $V_{in}$ at an input thereof. The primary circuit includes a main switch (also referred to as a first switch) $Q_{main}$ and an active clamp circuit. The active clamp circuit includes a series-coupled clamp switch (also referred to as a second switch) $Q_{clp}$ and clamp capacitor $C_{clp}$ coupled across the main switch $Q_{main}$. The forward converter also includes a transformer $T_1$ having a primary winding PRI, coupled to the primary circuit, and a secondary winding SEC.

The forward converter further includes a secondary circuit coupled to the secondary winding SEC of the transformer $T_1$. The secondary circuit includes a rectifier formed by a first synchronous rectifier switch $SR_1$ and a second synchronous rectifier switch $SR_2$. The secondary circuit also includes an output filter formed by an output inductor $L_{out}$ and an output capacitor $C_{out}$. The secondary circuit provides an output voltage $V_{out}$ at an output of the forward converter. The forward converter still further includes the controller 210 that includes a sensing circuit 220, a modification circuit 230 and a modulation circuit 240. The controller 210 modulates a duty cycle of the main and clamp switches $Q_{main}$, $Q_{clp}$ to, in part, regulate the output voltage $V_{out}$ of the forward converter.

The forward converter illustrated in FIG. 2 generally operates analogously to the forward converter illustrated and described with respect to FIG. 1. Thus, a discussion that follows will principally be directed to the controller 210 of the forward converter illustrated in FIG. 2. More specifically, the modulation circuit (e.g., a pulse width modulation circuit) 240 varies a duty cycle of the drive signals (e.g., pulse width modulated drive signals) for the main and clamp switches $Q_{main}$ to, in part, regulate the output voltage $V_{out}$ of the forward converter. The modulation circuit 240 monitors the output voltage $V_{out}$ and produces a drive signal that induces the main switch $Q_{main}$ to conduct for a primary duty cycle (D) to maintain the output voltage $V_{out}$ in regulation. Additionally, the modulation circuit 240 produces a drive signal that induces the clamp switch $Q_{clp}$ to conduct for a complementary duty cycle (D) to, ultimately, reset the core of the transformer $T_1$ of the forward converter.

The modulation circuit 240 further incorporates a delay between the conduction intervals of the main and clamp switches $Q_{main}$, $Q_{clp}$. As an example, at the conclusion of the complementary interval, the modulation circuit 240 transitions the clamp switch $Q_{clp}$ to a non-conducting state and, prior to transitioning the main switch $Q_{main}$ to a conducting state, incorporates a delay before commencing the primary interval. While it is an objective to maintain as small a delay as is practical, it is preferable to incorporate a definite delay to substantially foreclose a cross current condition as discussed above.

The sensing circuit 220 of the controller 210 senses a parameter representative of the input voltage $V_{in}$ of the forward converter. Analogous to FIG. 1, while the sensing circuit 220 is sensing the input voltage $V_{in}$ directly, other parameters are well within the broad scope of the present invention. The modification circuit 230 of the controller 210 includes an RC delay circuit (formed by a first resistor $R_{mod1}$ and a capacitor $C_{mod}$), a diode $D_{mod}$, and second resistor $R_{mod2}$ and a driver DRV. The RC delay circuit provides a period of delay which may be adjusted by the second resistor $R_{mod2}$, which is coupled to the input voltage $V_{in}$ of the forward converter, or a parameter (e.g. a voltage) proportional thereto.

As a result, the modification circuit 230 may provide a variable delay as a function of the input voltage $V_{in}$ of the forward converter. The diode $D_{mod}$ provides a path to provide for a substantially zero period of delay when the main and clamp switches $Q_{main}$, $Q_{clp}$ are being transitioned to a non-conducting state, and the driver DRV provides the drive signals to the main and clamp switches $Q_{main}$, $Q_{clp}$ when the drive signal thereto transcends a reference REF. The modification circuit 230, therefore, alters the drive signal produced by the modulation circuit 240 to the main switch $Q_{main}$. As a result, a delay between conduction intervals of the main and clamp switches $Q_{main}$, $Q_{clp}$ and, consequently, the first and second synchronous rectifier switches $SR_1$, $SR_2$ may be modified as a function of the input voltage $V_{in}$. While in the illustrated embodiment, the controller 210 includes a modification circuit 230 that alters a drive signal to the main switch $Q_{main}$, it should be understood that the modification circuit 230 may be configured to modify a drive signal to the clamp switch $Q_{clp}$ as well. Also, while the modification and modulation circuits 230, 240 work in concert to provide the delay in the illustrated embodiment, it is well within the broad scope of the present invention that the modification circuit 230 may provide and alter the period of delay.

Figure 3:
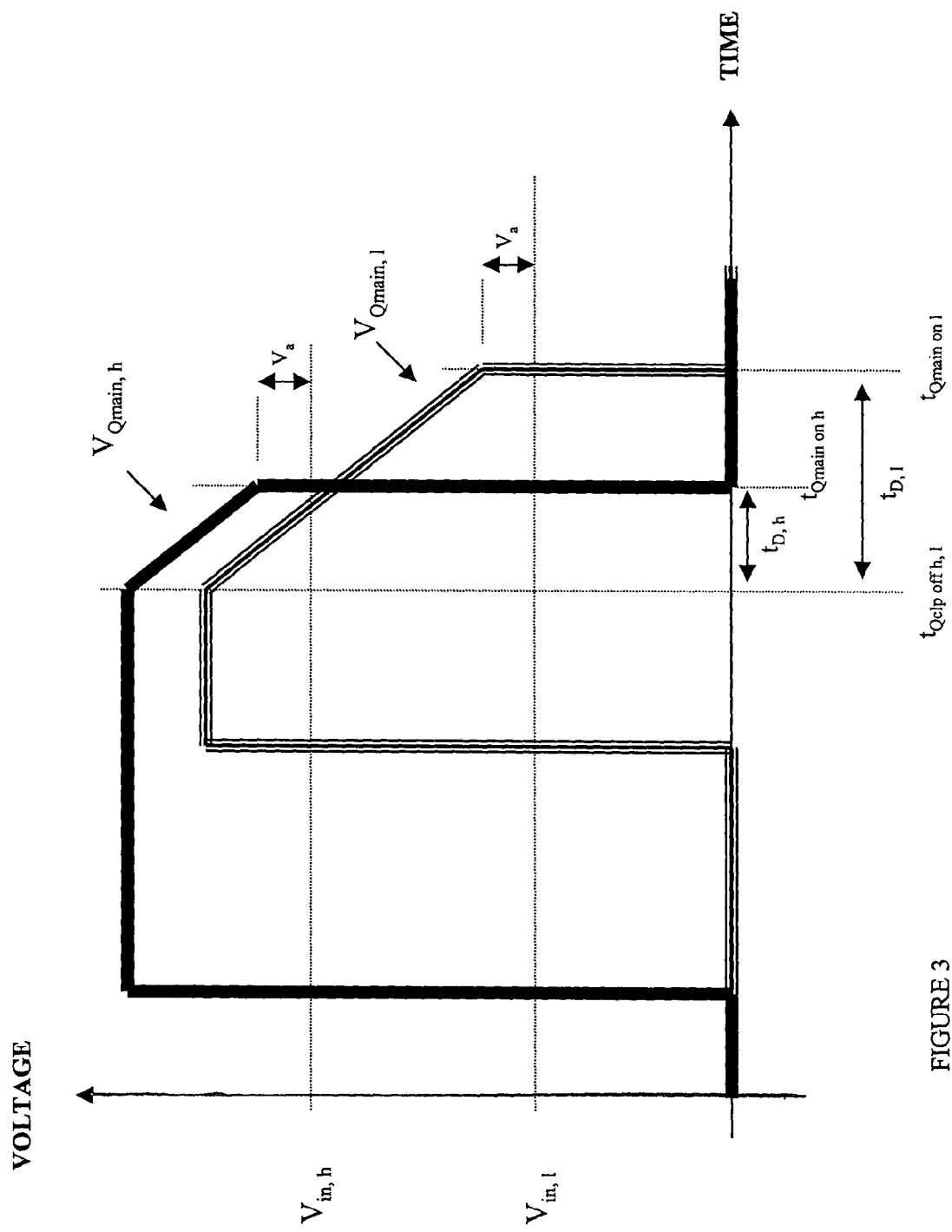
FIG. 3 illustrates a waveform diagram demonstrating an exemplary operation of the power converter illustrated and described with respect to FIG. 2.

Turning now to FIG. 3, illustrated is a waveform diagram demonstrating an exemplary operation of the power converter illustrated and described with respect to FIG. 2. Assuming a nominal design input voltage $V_{in}$ of 48 volts, the waveform diagram illustrates a high main switch voltage $V_{Qmain,h}$ associated with the main switch $Q_{main}$ at a higher input voltage $V_{in,h}$ (e.g., 75 volts) and the low main switch voltage $V_{Qmain,l}$ associated with the main switch $Q_{main}$ at a lower input voltage $V_{in,l}$ (e.g., 36 volts), both as a function of time. At a time period designated $t_{clpoff\_h,l}$ the clamp switch $Q_{clp}$ is transitioned to a non-conducting state. Prior to that period of time (i.e., the complementary interval), the main switch $Q_{main}$ is not conducting as demonstrated by the high main switch voltage $V_{Qmain,h}$ and low main switch voltage $V_{Qmain,h}$ waveforms.

Thereafter, the period of delay to transition the main switch $Q_{main}$ to a conducting state (during the primary interval) varies as a function of the input voltage $V_{in}$. Thus, based on the input voltage $V_{in}$, the modification circuit 230 varies the delay to transition the main switch $Q_{main}$ to a conducting state. More specifically, during a higher input voltage $V_{in,h}$ condition and at a time designated $t_{Qmainonh}$, the high main switch voltage $V_{Qmain,h}$ may reach a voltage represented by:

$V_{in,h}+V_a$, wherein $V_a=V_{gs,s} \times N_p/N_s$, and wherein $V_{gs,s}$ is a selected gate-to-source voltage associated with the second synchronous rectifier switch $SR_2$, and $N_p$ and $N_s$ are the number of turns associated with primary and secondary windings PRI, SEC, respectively, of the transformer $T_1$. The selected gate-to-source voltage $V_{gs,s}$ is typically a predetermined value that accommodates an at or near optimal period of delay to substantially prevent cross current conduction while, at the same time, not allowing an excessive period of delay. At that time $t_{Qmainonh}$, the main switch $Q_{main}$ is transitioned to a conducting state. A period of delay for the main switch $Q_{main}$ operating at the high main switch voltage $V_{Qmain,h}$ is designated $t_{D,h}$.

During a lower input voltage $V_{in,l}$ condition and at a time designated $t_{Qmainonl}$, the low main switch voltage $V_{Qmain,h}$ may reach a voltage represented by:

$V_{in,l}+V_a$, wherein $V_a=V_{gs,s} \times N_p/N_s$.

At that time $t_{Qmainonl}$, the main switch $Q_{main}$ is transitioned to a conducting state. A period of delay for the main switch $Q_{main}$ operating at the low main switch voltage $V_{Qmain,l}$ is designated $t_{D,l}$. As demonstrated by FIG. 3, the period of delay varies as a function of the input voltage $V_{in}$ with a longer period of delay being employed for forward converters operating at a lower input voltage $V_{in,l}$. In the illustrated embodiment, in either the higher or lower input voltage $V_{in,h}$, $V_{in,l}$ condition the selected gate-to-source voltage $V_{gs,s}$ and, ultimately, the transition voltage represented by $V_a$ are the same. By modifying the period of delay as a function of the input voltage $V_{in}$, however, the controller 210 transitions between the primary and complementary intervals at or near the optimal period of time, regardless of the input voltage $V_{in}$ of the forward converter.

Thus, a controller for, and related method of, controlling first and second alternately conducting switches of a power converter with readily attainable and quantifiable advantages has been introduced. Those skilled in the art should understand that the previously described embodiments of the controller, method of operating the first and second switches and power converter are submitted for illustrative purposes only and that other embodiments capable of modifying a delay between conduction intervals of complementary switches are well within the broad scope of the present invention. Additionally, analogous improvements are attainable in power converters employing synchronous rectifiers with different secondary drive methods such as ones in which an independent winding is used to drive synchronous rectifier switches or an additional number of turns are added to either termination of a secondary winding of a transformer to drive the synchronous rectifier switches.

Additionally, exemplary embodiments of the present invention have been illustrated with reference to specific electronic components. Those skilled in the art are aware, however, that components may be substituted (not necessarily with components of the same type) to create desired conditions or accomplish desired results. For instance, multiple components may be substituted for a single component and vice versa. The principles of the present invention may be applied to a wide variety of power converter topologies. For a better understanding of a variety of power converter topologies, see *Modern DC-to-DC Switchmode Power Converter Circuits*, by Rudolph P. Severns and Gordon Bloom, Van Nostrand Reinhold Company, New York, N.Y. (1985) and *Principles of Power Electronics*, by J. G. Kassakian, M. F. Schlecht and G. C. Verghese, Addison-Wesley (1991), which are incorporated herein by reference in their entirety.

Although the present invention has been described in detail, those skilled in the art should understand that they can make various changes, substitutions and alterations herein without departing from the spirit and scope of the invention in its broadest form.

What is claimed is:

1. A controller for use with a power converter including first and second alternately conducting switches, comprising:
   a sensing circuit configured to sense a parameter representative of an input voltage of said power converter; and
   a modification circuit configured to alter a drive signal to one of said first and second switches thereby modifying a delay between conduction intervals of said first and second switches as a function of said input voltage.

2. The controller as recited in claim 1 wherein said parameter comprises a duty cycle associated with one of said first and second switches.

3. The controller as recited in claim 1 wherein said modification circuit comprises an RC delay circuit and a resistor coupled to said sensing circuit.

4. The controller as recited in claim 1 wherein said modification circuit is configured to alter a drive signal to said first switch to modify said delay between a conducting state of said first switch and a non-conducting state of said second switch.

5. The controller as recited in claim 1 further comprising a modulation circuit configured to produce drive signals for said first and second switches.

6. The controller as recited in claim 5 wherein said modulation circuit is configured to cause said first switch to conduct for a primary duty cycle (D).

7. The controller as recited in claim 5 wherein said modulation circuit is configured to cause said second switch to conduct for a complementary duty cycle (1-D).

8. A method of controlling first and second alternately conducting switches of a power converter, comprising:
   sensing a parameter representative of an input voltage of said power converter; and
   altering a drive signal to one of said first and second switches thereby modifying a delay between conduction intervals of said first and second switches as a function of said input voltage.

9. The method as recited in claim 8 wherein said parameter comprises a duty cycle associated with one of said first and second switches.

10. The method as recited in claim 8 wherein said altering is performed by a modification circuit that includes an RC delay circuit and a resistor.

11. The method as recited in claim 8 wherein said method alters a drive signal to said first switch to modify said delay between a conducting state of said first switch and a non-conducting state of said second switch.

12. The method as recited in claim 8 further comprising producing pulse width modulated drive signals for said first and second switches.

13. The method as recited in claim 8 wherein said first switch conducts for a primary duty cycle (D).

14. The method as recited in claim 8 wherein said second switch conducts for a complementary duty cycle (1-D).

15. A power converter having an input that receives an input voltage and provides an output voltage at a output thereof, comprising:
   a primary circuit, coupled to said input, including first and second alternately conducting switches;
   a transformer including a primary winding and a secondary winding, said primary circuit being coupled to said primary winding;
   a secondary circuit, coupled to said secondary winding, including first and second synchronous rectifier switches; and
   a controller, including:
      a sensing circuit that senses a parameter representative of said input voltage of said power converter, and
      a modification circuit that alters a drive signal to one of said first and second switches thereby modifying a delay between conduction intervals of said first and second switches as a function of said input voltage.

16. The power converter as recited in claim 15 wherein said parameter comprises a duty cycle associated with one of said first and second switches.

17. The power converter as recited in claim 15 wherein said modification circuit comprises an RC delay circuit and a resistor coupled to said sensing circuit.

18. The power converter as recited in claim 15 wherein said modification circuit alters a drive signal to said first switch to modify said delay between a conducting state of said first switch and a non-conducting state of said second switch.

19. The power converter as recited in claim 15 wherein said controller further comprises a modulation circuit that produces drive signals for said first and second switches.

20. The power converter as recited in claim 19 wherein said modulation circuit causes said first switch to conduct for a primary duty cycle (D) and said second switch to conduct for a complementary duty cycle (1-D).

* * * * *